US011514796B2

(12) United States Patent
Zhang

(10) Patent No.: US 11,514,796 B2
(45) Date of Patent: Nov. 29, 2022

(54) SYSTEM AND METHOD FOR DETERMINING AND RECOMMENDING VEHICLE PICK-UP LOCATION

(71) Applicant: BEIJING DIDI INFINITY TECHNOLOGY AND DEVELOPMENT CO., LTD., Beijing (CN)

(72) Inventor: Xudong Zhang, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 216 days.

(21) Appl. No.: 16/893,354

(22) Filed: Jun. 4, 2020

(65) Prior Publication Data
US 2020/0302798 A1 Sep. 24, 2020

Related U.S. Application Data

(63) Continuation of application No. PCT/CN2017/114376, filed on Dec. 4, 2017.

(51) Int. Cl.
| | | |
|---|---|---|
| *G08G 1/00* | (2006.01) | |
| *H04W 4/029* | (2018.01) | |
| *H04W 4/80* | (2018.01) | |
| *G01C 21/34* | (2006.01) | |
| *G06Q 50/30* | (2012.01) | |
| *G07C 5/00* | (2006.01) | |

(52) U.S. Cl.
CPC ......... *G08G 1/202* (2013.01); *G01C 21/3438* (2013.01); *G06Q 50/30* (2013.01); *G07C 5/008* (2013.01); *H04W 4/029* (2018.02); *H04W 4/80* (2018.02)

(58) Field of Classification Search
CPC ........ G08G 1/202; H04W 4/029; H04W 4/80; G01C 21/3438
See application file for complete search history.

(56) References Cited

U.S. PATENT DOCUMENTS

| | | |
|---|---|---|
| 8,688,378 B2 | 4/2014 | McCall et al. |
| 11,107,019 B2 | 8/2021 | Hayama et al. |
| (Continued) | | |

FOREIGN PATENT DOCUMENTS

| | | |
|---|---|---|
| CN | 1484206 A | 3/2004 |
| CN | 101799978 A | 8/2010 |
| (Continued) | | |

OTHER PUBLICATIONS

First Office Action and Search Report dated Jun. 10, 2021, issued in related Chinese Application No. 201780092699.0, with English machine translation (14 pages).

(Continued)

*Primary Examiner* — Siming Liu
(74) *Attorney, Agent, or Firm* — Sheppard Mullin Richter & Hampton LLP

(57) ABSTRACT

Systems and methods are provided for determining vehicle pick-up location. An exemplary method may comprise obtaining a user's location and a request by the user for transportation to a destination, determining a vehicle to respond to the request, obtaining the determined vehicle's location, and determining a pick-up location for the vehicle to pick up the user based at least on the user's location, the destination's location, and the vehicle's location.

17 Claims, 7 Drawing Sheets

(56) References Cited

U.S. PATENT DOCUMENTS

| | | | |
|---|---|---|---|
| 11,340,631 | B2 | 5/2022 | Zhang |
| 2002/0069017 | A1 | 6/2002 | Schmier et al. |
| 2010/0207812 | A1 | 8/2010 | Demirdjian et al. |
| 2011/0145089 | A1 | 6/2011 | Khunger et al. |
| 2013/0054311 | A1 | 2/2013 | Kataria et al. |
| 2014/0039784 | A1 | 2/2014 | Millspaugh |
| 2015/0161564 | A1 | 6/2015 | Sweeney et al. |
| 2015/0206267 | A1 | 7/2015 | Khanna et al. |
| 2015/0304954 | A1 | 10/2015 | Korenaga et al. |
| 2015/0324945 | A1 | 11/2015 | Lord et al. |
| 2015/0339923 | A1* | 11/2015 | Konig .............. G08G 1/127 709/219 |
| 2015/0377635 | A1* | 12/2015 | Beaurepaire .......... G05D 1/021 701/408 |
| 2016/0034845 | A1 | 2/2016 | Hiyama et al. |
| 2016/0364823 | A1 | 12/2016 | Cao |
| 2016/0370194 | A1 | 12/2016 | Colijn et al. |
| 2017/0034110 | A1 | 2/2017 | Bijor et al. |
| 2017/0059347 | A1 | 3/2017 | Flier et al. |
| 2017/0308095 | A1 | 10/2017 | Irion et al. |
| 2017/0365030 | A1 | 12/2017 | Shoham et al. |
| 2018/0058863 | A1 | 3/2018 | Meyer et al. |
| 2018/0149484 | A1 | 5/2018 | Baer |
| 2018/0165731 | A1 | 6/2018 | Gopalakrishnan et al. |
| 2018/0189918 | A1 | 7/2018 | Lu |
| 2018/0211541 | A1 | 7/2018 | Rakah et al. |
| 2018/0268324 | A1 | 9/2018 | Zhang et al. |
| 2019/0354903 | A1 | 11/2019 | Seki et al. |
| 2020/0260219 | A1 | 8/2020 | Pao et al. |
| 2020/0327516 | A1 | 10/2020 | Bai et al. |
| 2021/0063175 | A1 | 3/2021 | Singh et al. |
| 2021/0073934 | A1 | 3/2021 | Bai et al. |
| 2021/0076157 | A1 | 3/2021 | Yuan |
| 2021/0262810 | A1 | 8/2021 | Cun et al. |

FOREIGN PATENT DOCUMENTS

| | | | |
|---|---|---|---|
| CN | 103050003 | A | 4/2013 |
| CN | 203260190 | U | 10/2013 |
| CN | 103531023 | A | 1/2014 |
| CN | 103971507 | A | 8/2014 |
| CN | 104135528 | A | 11/2014 |
| CN | 104463509 | A | 3/2015 |
| CN | 104464274 | A | 3/2015 |
| CN | 104778554 | A | 7/2015 |
| CN | 104899252 | A | 9/2015 |
| CN | 105045921 | A | 11/2015 |
| CN | 105094767 | A | 11/2015 |
| CN | 105225468 | A | 1/2016 |
| CN | 105243836 | A | 1/2016 |
| CN | 105279956 | A | 1/2016 |
| CN | 105489001 | A | 4/2016 |
| CN | 105575104 | A | 5/2016 |
| CN | 105575104 | A * | 5/2016 |
| CN | 105677793 | A | 6/2016 |
| CN | 105678412 | A | 6/2016 |
| CN | 105702035 | A | 6/2016 |
| CN | 105897821 | A | 8/2016 |
| CN | 105957337 | A | 9/2016 |
| CN | 106022540 | A | 10/2016 |
| CN | 106228383 | A | 12/2016 |
| CN | 106469514 | A | 3/2017 |
| CN | 106530190 | A | 3/2017 |
| CN | 106709596 | A | 5/2017 |
| CN | 106779141 | A | 5/2017 |
| CN | 106940928 | A | 7/2017 |
| CN | 107230091 | A | 10/2017 |
| CN | 107767322 | A | 3/2018 |
| DE | 10-2014-221751 | A1 | 4/2016 |
| JP | H0923063 | A | 1/1997 |
| JP | 2016-057946 | A | 4/2016 |
| WO | 2014074407 | A1 | 5/2014 |
| WO | 2014/092113 | A1 | 6/2014 |
| WO | 2017143815 | A1 | 8/2017 |

OTHER PUBLICATIONS

First Search dated Jul. 6, 2021, issued in related Chinese Application No. 201880043912.3 (2 pages).

Extended European Search Report dated May 26, 2021, issued in related European Application No. 18919269.3 (7 pages).

International Search Report in PCT/CN2017/114376 dated Jul. 4, 2018, 4 pages.

Written Opinion in PCT/CN2017/114376 dated Jul. 4, 2018, 3 pages.

International Search Report in PCT/CN2018/087442 dated Feb. 20, 2019, 4 pages.

Written Opinion in PCT/CN2018/087442 dated Feb. 20, 2019, 3 pages.

International Search Report in PCT/CN2018/116068 dated Feb. 22, 2019, 3 pages.

Written Opinion in PCT/CN2018/116068 dated Feb. 22, 2019, 4 pages.

International Search Report in PCT/CN2018/122444 dated Mar. 19, 2019, 3 pages.

Written Opinion in PCT/CN2018/122444 dated Mar. 19, 2019, 4 pages.

Supplementary Search dated Aug. 24, 2021, issued in related Chinese Application No. 201780092699.0 (1 page).

First Office Action dated Jul. 16, 2021, issued in related Chinese Application No. 201880043912.3, with English machine translation (39 pages).

Non-Final Office Action dated Oct. 25, 2021, issued in related U.S. Appl. No. 16/950,961 (33 pages).

PCT International Preliminary Report on Patentability dated Jun. 18, 2020, issued in related International Application No. PCT/CN2017/114376 (5 pages).

PCT International Preliminary Report on Patentability dated Jun. 18, 2020, issued in related International Application No. PCT/CN2018/0116068 (6 pages).

PCT International Preliminary Report on Patentability dated Dec. 3, 2020, issued in related International Application No. PCT/CN2018/087442 (5 pages).

PCT International Preliminary Report on Patentability dated Dec. 3, 2020, issued in related International Application No. PCT/CN2018/122444 (6 pages).

Second Office Action dated Jan. 25, 2022, issued in related Chinese Application No. 201880043912.3, with English machine translation (22 pages).

Supplementary Search dated Jun. 9, 2022, issued in related Chinese Application No. 201880043912.3 (2 pages).

Final Office Action dated Apr. 8, 2022, issued in related U.S. Appl. No. 16/950,961 (43 pages).

Non-Final Office Action dated Mar. 3, 2022, issued in related U.S. Appl. No. 16/950,948 (9 pages).

Notice of Allowance dated Jun. 16, 2022, issued in related U.S. Appl. No. 16/950,948 (9 pages).

Non-Final Office Action dated Apr. 14, 2022, issued in related U.S. Appl. No. 16/892,481 (32 pages).

Final Office Action dated Sep. 22, 2022, issued in related U.S. Appl. No. 16/892,481 (32 pages).

* cited by examiner

SYSTEM AND METHOD FOR DETERMINING AND RECOMMENDING VEHICLE PICK-UP LOCATION

CROSS-REFERENCE TO RELATED APPLICATIONS

This application is a continuation of International Application No. PCT/CN2017/114376, filed on Dec. 4, 2017, the entire contents of which are incorporated herein by reference.

TECHNICAL FIELD

This disclosure generally relates to approaches and techniques for vehicle pick-up location optimization.

BACKGROUND

User convenience and travel efficiency are important factors to the experience of vehicle services. For example, a user often would like to be transported to a destination with the least hassle, and the driver transporting the user would like to finish the trip as quickly as possible. Thus, determining the pick-up location is critical to providing optimized vehicle services.

SUMMARY

Various embodiments of the present disclosure can include systems, methods, and non-transitory computer readable media configured to perform vehicle pick-up location determination and recommendation. In some embodiments, a method for determining vehicle pick-up location may comprise obtaining a user's location and a request by the user for transportation to a destination, determining a vehicle to respond to the request, obtaining the determined vehicle's location, and determining a pick-up location for the vehicle to pick up the user based at least on the user's location, the destination's location, and the vehicle's location.

In some embodiments, the request comprises transporting at least one of the user, a person associated with the user, or an item associated with the user from an origin to the destination, and the origin is a default pick-up location.

In some embodiments, obtaining the user's location comprises obtaining the user's location based at least in part on GPS (global position system) data of a device associated with the user. Determining the vehicle to respond to the request comprises determining one or more candidate vehicles within a preset range from the user's location, transmitting the request to the one or more candidate vehicles, and determining at least one of the candidate vehicles accepting the request as the vehicle to respond to the request. Obtaining the vehicle's location comprises obtaining the vehicle's location based at least in part on the vehicle's GPS data.

In some embodiments, determining the pick-up location for the vehicle to pick up the user based at least on the user's location, the destination's location, and the vehicle's location may comprise: determining one or more candidate locations within a preset range from the user's location; determining a utility for picking up at each of a plurality of locations, including the one or more candidate locations and the origin, based on a travel distance for the vehicle and/or a travel time for the vehicle; determining one of the plurality of locations having the highest utility; determining a travel distance for the user to the location of the highest utility and comparing the determined travel distance for the user with a preset threshold; in response to the determined travel distance of the user below the preset threshold, determining the location of the highest utility as the pick-up location. The travel distance for the vehicle may comprise a first travel distance from the vehicle's location to the pick-up location and a second travel distance from the pick-up location to the destination. The travel time for the vehicle may comprise a first travel time from the vehicle's location to the pick-up location and a second travel time from the pick-up location to the destination. The utility may be inversely proportional to each of the travel distance for the vehicle and the travel time for the vehicle.

In some embodiments, the travel for the user includes at least one of walking or biking.

In some embodiments, each of the first and second travel distances for the vehicle and the first and second travel time for the vehicle has a corresponding weight in determining the utility, and the first and second travel distances for the vehicle have weights larger than the first and second travel time for the vehicle.

In some embodiments, the weights and the preset threshold are dynamically adjustable.

In some embodiments, the method for determining vehicle pick-up location may further comprise transmitting the pick-up location to a device associated with the user in recommendation of replacing the original with the pick-up location, in response to receiving an acceptance of the pick-up location, transmitting the pick-up location to the vehicle or a device associated with a driver of the vehicle, and in response to receiving a rejection of the pick-up location, transmitting the origin to the vehicle or the device associated with the driver of the vehicle.

In some embodiments, a system for determining vehicle pick-up location, may comprise a server configured to: obtain a user's location and a request by the user for transportation to a destination, determine a vehicle to respond to the request, obtain the determined vehicle's location, and determine a pick-up location for the vehicle to pick up the user based at least on the user's location, the destination's location, and the vehicle's location.

In some embodiments, a non-transitory computer-readable storage medium may store instructions that, when executed by a processor, cause the processor to perform a method for determining vehicle pick-up location. The method may comprise obtaining a user's location and a request by the user for transportation to a destination, determining a vehicle to respond to the request, obtaining the determined vehicle's location, and determining a pick-up location for the vehicle to pick up the user based at least on the user's location, the destination's location, and the vehicle's location.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
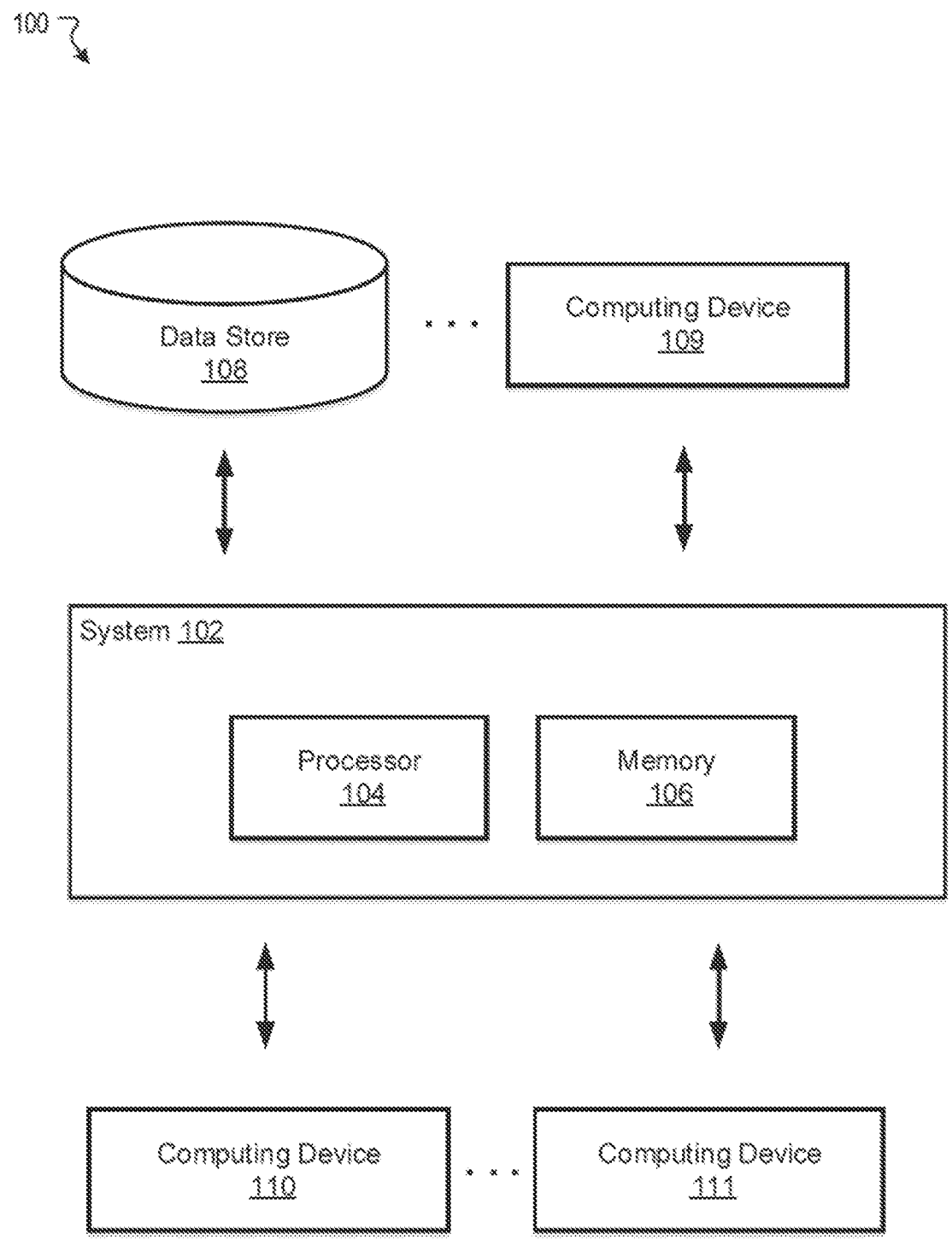
FIG. 1 illustrates an example environment for determining and recommending vehicle pick-up locations, in accordance with various embodiments.

Current technologies are inadequate to provide convenient and efficient vehicle pick-up services. In particular, various vehicle hailing service providers rely on users to configure pick-up locations. For example, a user may request a driver to come to the user's current position for pick-up. For another example, a user may pick any location from a map for pick-up. In these implementations, the overall efficiency is unoptimized. The user's decision for pick-up location often ignores the overall travel time and distance for the vehicle driver. The driver has to abide by the chosen pick-up location even at the expense of making detours, lowering the overall travel efficiency for the driver and the passenger.

Various embodiments described below can overcome such problems arising in the realm of providing vehicle services. The vehicle service platform, by obtaining information of various locations, can best determine the most efficient travel plan, including the optimal pick-up location, and recommend such pick-up location to the user. In various embodiments, systems, methods, and non-transitory computer readable media configured to perform vehicle pick-up location determination and recommendation are disclosed. In some embodiments, a method for determining vehicle pick-up location may comprise obtaining a user's location and a request by the user for transportation to a destination, determining a vehicle to respond to the request, obtaining the determined vehicle's location, and determining a pick-up location for the vehicle to pick up the user based at least on the user's location, the destination's location, and the vehicle's location.

In some embodiments, obtaining the user's location comprises obtaining the user's location based at least in part on GPS (global position system) data of a device associated with the user. Determining the vehicle to respond to the request comprises determining one or more candidate vehicles within a preset range from the user's location, transmitting the request to the one or more candidate vehicles, and determining at least one of the candidate vehicles accepting the request as the vehicle to respond to the request. Obtaining the vehicle's location comprises obtaining the vehicle's location based at least in part on the vehicle's GPS data.

In some embodiments, determining the pick-up location for the vehicle to pick up the user based at least on the user's location, the destination's location, and the vehicle's location may comprise: determining one or more candidate locations within a preset range from the user's location; determining a utility for picking up at each of a plurality of locations, including the one or more candidate locations and the origin, based on at least one of: a travel distance for the vehicle or a travel time for the vehicle; determining one of the plurality of locations having the highest utility; determining a travel distance for the user to the location of the highest utility and comparing the determined travel distance for the user with a preset threshold; in response to the determined travel distance of the user below the preset threshold, determining the location of the highest utility as the pick-up location. The travel distance for the vehicle may comprise a first travel distance from the vehicle's location to the pick-up location and a second travel distance from the pick-up location to the destination. The travel time for the vehicle may comprise a first travel time from the vehicle's location to the pick-up location and a second travel time from the pick-up location to the destination. The utility may be inversely proportional to each of the travel distance for the vehicle and the travel time for the vehicle.

In some embodiments, each of the first and second travel distances for the vehicle and the first and second travel time for the vehicle has a corresponding weight in determining the utility, and the first and second travel distances for the vehicle have weights larger than the first and second travel time for the vehicle.

In some embodiments, the method for determining vehicle pick-up location may further comprise transmitting the pick-up location to a device associated with the user in recommendation of replacing the original with the pick-up location, in response to receiving an acceptance of the pick-up location, transmitting the pick-up location to the vehicle or a device associated with a driver of the vehicle, and in response to receiving a rejection of the pick-up location, transmitting the origin to the vehicle or the device associated with the driver of the vehicle.

FIG. 1 illustrates an example environment 100 for determining and recommending vehicle pick-up locations, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various methods and steps described herein.

The environment 100 may include one or more data stores (e.g., a data store 108) and/or one or more computing devices (e.g., a computing device 109) that are accessible to the system 102. In some embodiments, the system 102 may be configured to obtain various information from the data store 108 and/or the computing device 109. For example, the computing device 109 may be a server for handling driver-side information or the data store 108 may be configured to store driver-side information, and the system 102 may be a server for handling customer-side information. The system 102 may obtain driver information from the computing device 109 and/or the data store 108 for determining and recommending vehicle pick-up locations. Alternatively, the data store 108, the computing device 109, and the system 102 may be integrated in one device (e.g., a server). The information obtained by the system 102 may include common pick-up or drop-off locations and may be stored at one or more places such as the memory 106, the data store 108, and/or the computing device 109 and available to the system 102. The common pick-up and drop-off locations may be accumulated based on public data, user-uploaded information, manually-identified locations, history transportation routes, etc. For example, the system 102 may have handled multiple vehicle service requests for transportation. Based on real-time GPS (global positioning system) locations of the vehicles, stop-over time at various locations based on the real-time traffic and GPS, and/or manual confirmation by the passenger or driver, the system 102 can obtain the actual and accurate locations for pick-up and drop-off (e.g., at the taxi stand next to Bus 123's first bus stand on XYZ street, by the northeast gate of the XYY park, at the front gate of the XZZ company headquarter building, etc.). A similar location being used for more than a preset threshold times (e.g., five times) may qualify as common pick-up or drop-off locations. As described below, these common pick-up and drop-off locations may be used as candidates for determining the optimal pick-up location. By synthesizing such data and information, the system 102 may obtain a database of locations for pick-up or drop-off.

The environment 100 may further include one or more computing devices (e.g., computing devices 110 and 111) coupled to the system 102. The computing devices may comprise various types devices such as cellphone, tablet, computer, wearable device (smart watch), etc. The computing devices may transmit or receive data (e.g., request, query, information, etc.) to or from the system 102. In some embodiments, the system 102 may implement an online information or service platform, and the computing devices 110 and 111 may represent user or driver devices accessing the service platform. The computing device may also be integrated with a vehicle (e.g., as a navigation module of a vehicle). The computing devices 110 and 111 may be installed with appropriate software (e.g., Application, platform program, etc.) and/or hardware (e.g., wires, wireless cards, etc.) to access the system 102.

In one example, the system 102 may be implemented via a vehicle (hailing) service platform, and the computing devices 110 and 111 may be implemented via mobile phones used by users and vehicle drivers respectively. The service platform may be associated with vehicles (e.g., cars, bikes, boats, airplanes, etc.), and the system 102 may be referred to as a vehicle information, a vehicle service, or a vehicle hailing platform. Some platform data (e.g., vehicle information, vehicle driver information, etc.) may be stored in the memory 106 or retrievable from the data store 108 and/or the computing device 109. The computing devices 110 and 111 may be associated (e.g., carried with and used by) various parties accessing the platform (e.g., a user's or a driver's cellphone installed with an Application of the platform). The user may request the platform to provide a transportation service for the user, another person associated with the user, and/or an item. The platform may relay the request to a vehicle or a driver to carry out the transportation.

Although the system 102 is shown as a single component in this figure, it is appreciated that the system 102 can be implemented as a single device or multiple devices (e.g., computers, servers, etc.) coupled together. For example, the system 102 may be implemented as a first server and a second server coupled together, and the first server may be configured to interact with the computing devices associated with users, and the second server may be configured to interact with the computing devices associated with drivers. The second server may also be alternatively implemented as multiple connected computers and servers, for example, each configured as a function module.

In some embodiments, the data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. In general, the system 102, the computing devices 110 and 111, and the data store 108 may be able to communicate with one another through one or more wired or wireless networks (e.g., the Internet) through which data can be communicated. Various aspects of the environment 100 are described below with reference to FIG. 2A to FIG. 5.

Figure 2A:
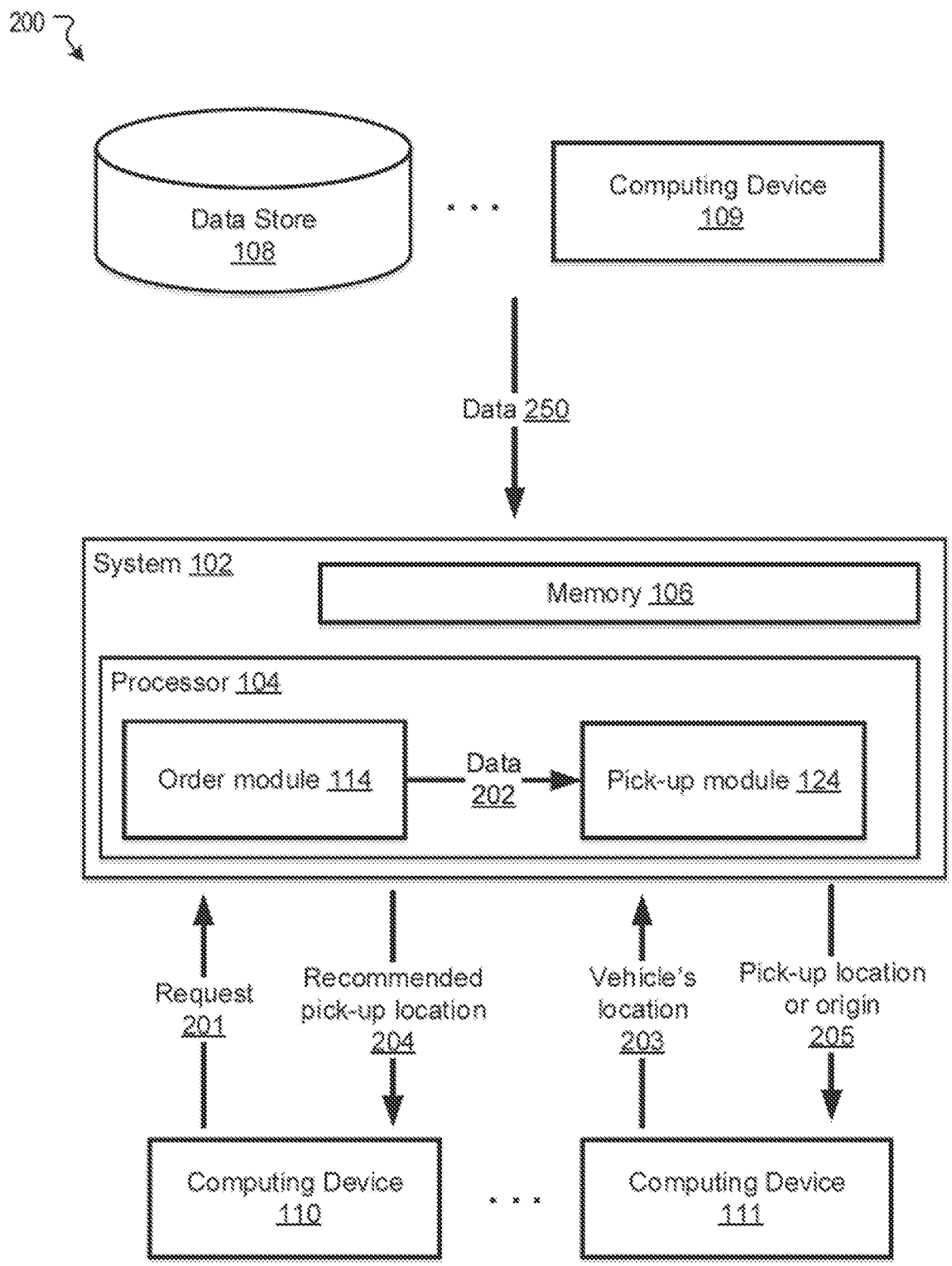
FIG. 2A illustrates an example system for determining and recommending vehicle pick-up locations, in accordance with various embodiments.

FIG. 2A illustrates an example system 200 for determining and recommending vehicle pick-up locations, in accordance with various embodiments. The operations shown in FIG. 2A and presented below are intended to be illustrative. In various embodiments, the system 102 may implement a vehicle hailing platform described above. A user of the platform may use the computing device 110 to request vehicle services, and a vehicle driver may use the computing device 111 to respond to the request and provide the requested vehicle service (e.g., transporting the user from one place to another). The system 102 may obtain data 250 from the data store 108 and/or the computing device 109. The data 250 may comprise user and driver information (e.g., registered users, registered drivers, identifications of the users and drivers, etc.). The identification of the users and drivers may be associated with detailed information (e.g., vehicle plate number, gender, payment account, etc.) of the parties respectively in databases. The data 250 may comprise common pick-up and/or drop-off locations discussed above and/or any other suitable locations for pick-up (e.g., locations configured by users or platform operators). The obtained data may be stored in the memory 106. Alternatively, the data 250 may be obtained by the system 102 from other sources (e.g., directly from users).

In some embodiments, a user (e.g., a passenger) may use computing device 110 to transmit a request 201 (e.g., a vehicle service request) to the system 102 (e.g., a vehicle hailing platform). The request may comprise an ID (identification) of the user (e.g., an ID of the user's account used to log on an Application installed in the computing device 110 for submitting the request 201). The request 201 may further comprise the user's location and a request by the user for transportation to a destination, and the system 102 may obtain the request. The destination may comprise an end location for the requested transportation. The request may optionally comprise an origin as a starting location of the requested transportation (e.g., a place where the user would like to be picked up). The request may comprise transporting the user, a person associated with the user (e.g., the user's friend), and/or an item associated with the user (e.g., the user's friend's luggage) from the origin to the destination.

There may be various ways to determine the origin and the destination. Obtaining the user's location may comprise obtaining the user's location based at least in part on GPS (global position system) data of a device associated with the user (e.g., the computing device 110 used by the user). In one example, the user may input addresses of the origin and the destination to the computing device 110 and transmit them to the system 102 as a part of the request. The system 102 may retrieve the GPS data corresponding to the addresses from various sources and determine the pick-up location as described below. For another example, the computing device 110 may be equipped with a GPS module configured to determine the location of itself. The user may use the determined location of the computing device 110 as the origin, or alternatively, choose a location on a map as the origin based on the location of the computing device 110 (e.g., by dragging the map and picking a location near the location of the computing device 110 as the origin, etc.).

As discussed above, the determination of the origin may be optional. That is, the system 102 can determine a pick-up location for the user without the provided origin. Alternatively, the system 102 can use the provided origin as a default pick-up location, and determine if a better pick-up location exists and can be recommended to the user as described below.

Still referring to FIG. 2A, the processor 104 may comprise one or more modules (e.g., an order module 114 and a pick-up module 124) configured to implement various methods or steps described herein. Though shown as two separate modules, the order module 114 and the pick-up module 124 may be integrated into one module or divided into more modules. Upon receiving the request 201, the system 102 may forward at least a part of the request 201 to the order module 114. The order module 114 may determine a vehicle to respond to the request. Determining the vehicle to respond to the request may comprise determining one or more candidate vehicles within a preset range (e.g., 500 m) from the user's location, transmitting the request to the one or more candidate vehicles (e.g., mobile phones used by drivers of the candidate vehicles), and determining at least one of the candidate vehicles accepting the request as the vehicle (e.g., a first driver accepting the request from an Application installed in the mobile phone) to respond to the request. Here, responding to the request may comprise fulfilling the request of transportation from one place to another as submitted by the user.

Upon determining the vehicle to respond to the request, the order module 114 may obtain an ID of the vehicle (e.g., a ID associated with an account of a current driver of the vehicle). The order module 114 may forward data 202 to the pick-up module 124. The data 202 may comprise information of the request 201 and the determined vehicle (e.g., the ID of the user and the ID of the vehicle). The ID of the user may be associated with the user's location, the location of the destination, and/or the location of the origin. The ID of the vehicle may be associated with the vehicle's current location (e.g., vehicle's location 203), which can be obtained from the computing device 111. The pick-up module 124 may receive both IDs and obtain the associated information.

Still referring to FIG. 2A, the pick-up module 124 may determine a pick-up location for the vehicle to pick up the user based at least on the user's location, the destination's location, and the vehicle's location. Obtaining the vehicle's location may comprise obtaining the vehicle's location based at least in part on the vehicle's GPS data. For example, the vehicle may be equipped with a GPS (implemented as the computing device 111) that transmits GPS information of the vehicle to the system 102 in real-time. For another example, the vehicle driver's mobile phone may be carried with the driver in the vehicle, and the mobile phone (implemented as the computing device 111) may be equipped with a GPS that transmits GPS information of the vehicle to the system 102 in real-time.

In some embodiments, determining the pick-up location for the vehicle to pick up the user based at least on the user's location, the destination's location, and the vehicle's location may comprise (1) determining one or more candidate locations within a preset range from the user's location, (2) determining a utility for picking up at each of a plurality of locations, including the one or more candidate locations and the origin, based on at least one of: a travel distance for the vehicle or a travel time for the vehicle, (3) determining one of the plurality of locations having the highest utility, (4) determining a travel distance for the user to the location of the highest utility and comparing the determined travel distance for the user with a preset threshold, and (5) in response to the determined travel distance of the user below the preset threshold, determining the location of the highest utility as the pick-up location. The travel distance for the vehicle may comprise a first travel distance from the vehicle's location to the pick-up location and a second travel distance from the pick-up location to the destination. The travel time for the vehicle may comprise a first travel time from the vehicle's location to the pick-up location and a second travel time from the pick-up location to the destination. The utility may be inversely proportional to each of the travel distance for the vehicle and the travel time for the vehicle. The travel for the user may include at least one of walking or biking. In some embodiments, the travel for the user can be assumed to be walking. More details of determining the pick-up location for the vehicle to pick up the user based at least on the user's location, the destination's location, and the vehicle's location are described below with reference to FIG. 2B.

As such, the utility determination algorithm can first determine one or more potential pick-up locations that are efficient in terms of the overall travel distance and time (e.g., from accepting the request to finishing transporting the user) for the driver. Comparing the potential pick-up location of the highest utility with the threshold can factor in the user's utility: to screen pick-up locations that are too far for the user to walk to. Thus, a balance can be struck between the driver and the user's utilities to achieve an overall efficient travel.

In some embodiments, each of the first and second travel distances for the vehicle and the first and second travel time for the vehicle has a corresponding weight in determining the utility. In some embodiments, the travel distance for the user to the location of the highest utility may also has a weight and be included in the utility determination to obtain a combined utility of the driver and the user. All of the weights and/or the preset threshold may be dynamically adjustable (e.g., based on time, season, region, location, weather, weekday, weekend, holiday, gas price, traffic, etc.). For example, at morning or afternoon peak hours and not during other hours, the travel time for the vehicle may have larger weights than others. For another example, at summer, winter, and rainy days and not during other days, the travel distance for the user may have a larger weight than others or may be much smaller than that during spring, fall, and sunny days. For yet another example, at a region where gas price is unreasonably high, the travel distance for the vehicle may have a weight larger than other factors. In some embodiments, the first and second travel distances for the vehicle have weights larger than the first and second travel time for the vehicle.

The system 102 may obtain the various weights based on methods including, for example, data analysis. The system 102 and associated systems or devices may have accumulated travel information over time. For example, real-time travel information (e.g., travel distances and durations) can be recorded via the use of a vehicle hailing platform application installed in the mobile phone of a vehicle driver or passenger. Based on the accumulated travel information, average travel distances and travel time can be extrapolated against each other and against public data such as time, season, region, location, weather, weekday, weekend, holiday, gas price, traffic, etc. Alternatively, the various weights can be determined from other well-known bases (e.g., the weight for travel time is increased during peak hours). Thus, based on the current weather, season, gas price, or other factors, the current weights of first and second travel distances for the vehicle and the first and second travel time for the vehicle can be obtained. The system 102 can obtain information on the current weather, season, gas price, or other factors from other applications on the same system or different system, its own memory, or from networks (e.g., the Internet).

Still referring to FIG. 2A, upon determining the pick-up location, the system 102 may transmit the pick-up location (e.g., a recommended pick-up location 204) to a device associated with the user (e.g., the user's computing device 110) in recommendation of replacing the original with the pick-up location. For example, the recommended pick-up location 204 may be displayed as a pop-up on the computing device 110, prompting the user to accept or decline. In response to receiving an acceptance of the pick-up location (e.g., if the user accepts the recommended pick-up location 204), the system 102 may transmit the pick-up location (e.g., the recommended pick-up location 204) to the determined vehicle or a device associated with a driver of the determined vehicle (e.g., the driver's mobile phone, the vehicle's display or navigation system, etc.). In response to receiving a rejection of the pick-up location (e.g., if the user rejects the recommended pick-up location 204), the system 102 may transmit the origin to the vehicle or the device associated with the driver of the vehicle. Accordingly, the driver of the determined vehicle can proceed to the recommended pick-up location or the origin to pick up the user.

Figure 2B:
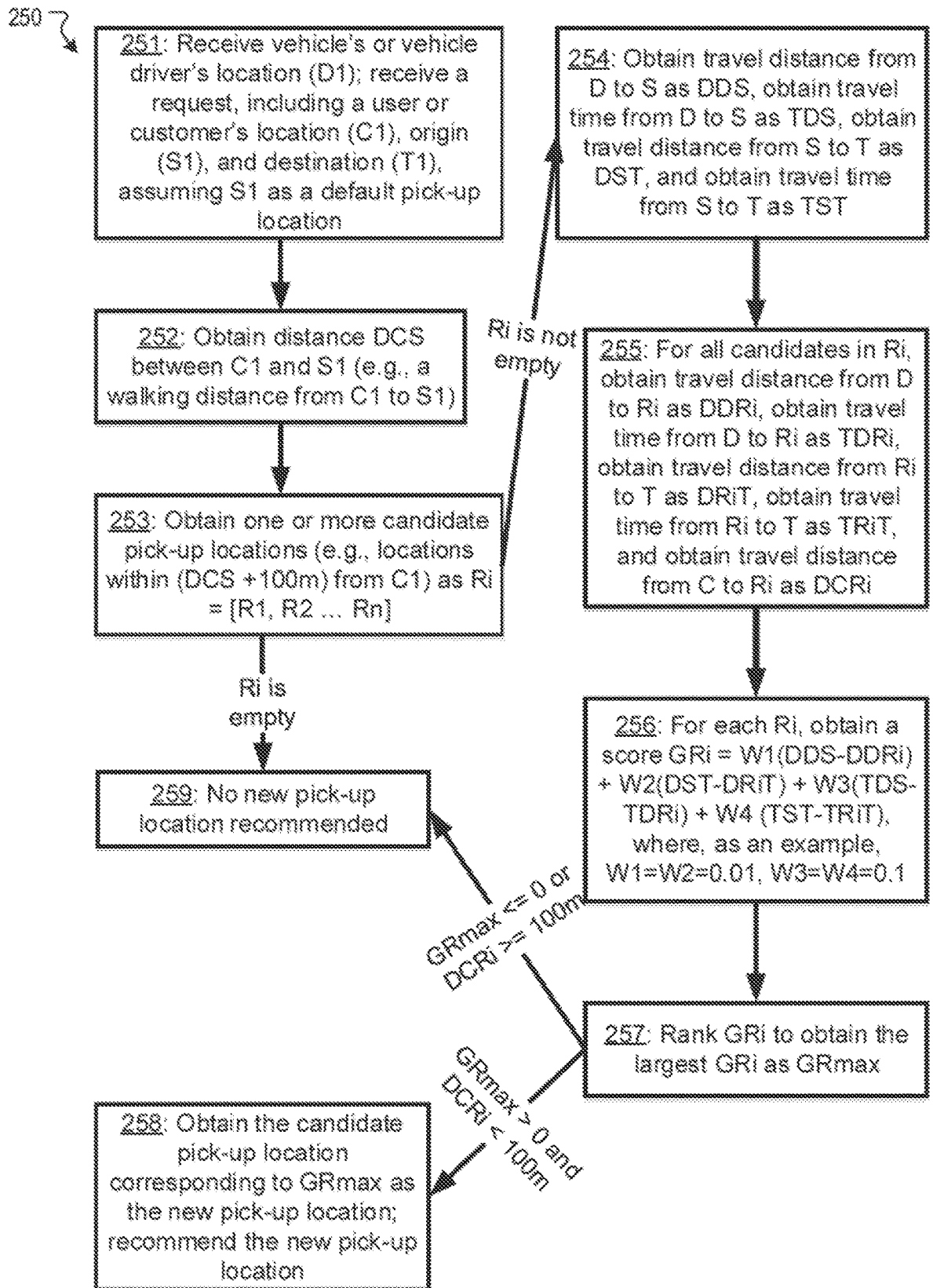
FIG. 2B illustrates an example method for determining and recommending vehicle pick-up locations, in accordance with various embodiments.

FIG. 2B illustrates an example method 250 for determining and recommending vehicle pick-up locations, in accordance with various embodiments. The method 250 may provide exemplary steps for determining the pick-up location for the vehicle to pick up the user based at least on the user's location, the destination's location, and the vehicle's location. The method 250 may be implemented in various environments including, for example, the environment 100 of FIG. 1. The method 250 may be implemented by one or more component of various system including, for example, the processor 104 and/or the memory 106 of the system 200 of FIG. 2A. The method 250 may be implemented by a server (e.g., the system 102). The operations of method 250 presented below are intended to be illustrative. Depending on the implementation, the example method 250 may include additional, fewer, or alternative steps performed in various orders or in parallel.

Figure 3A:
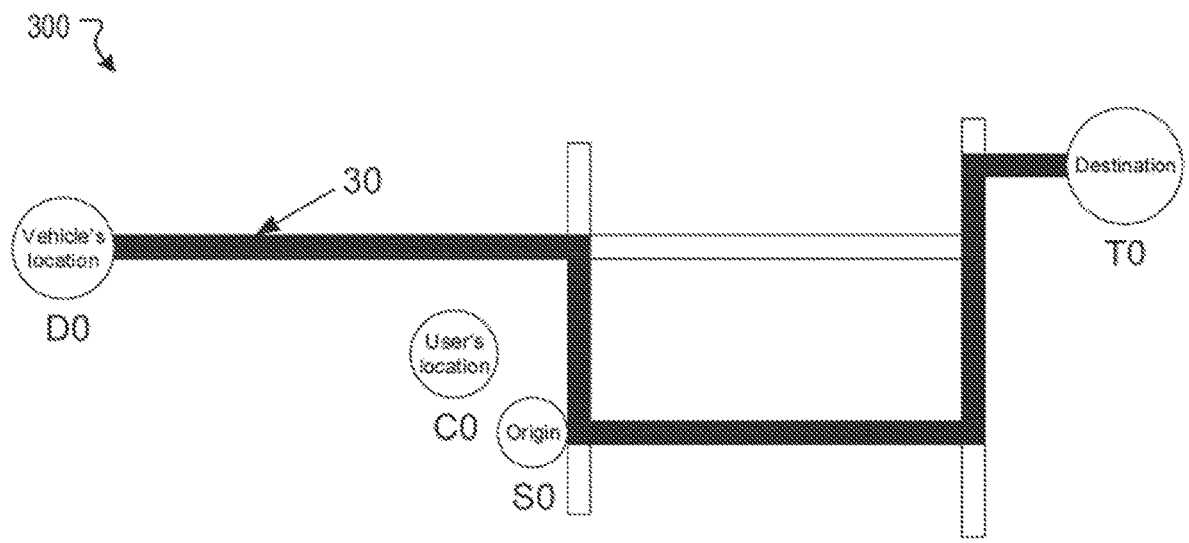
FIG. 3A is an example illustration of vehicle pick-up in prior art.
Figure 3B:
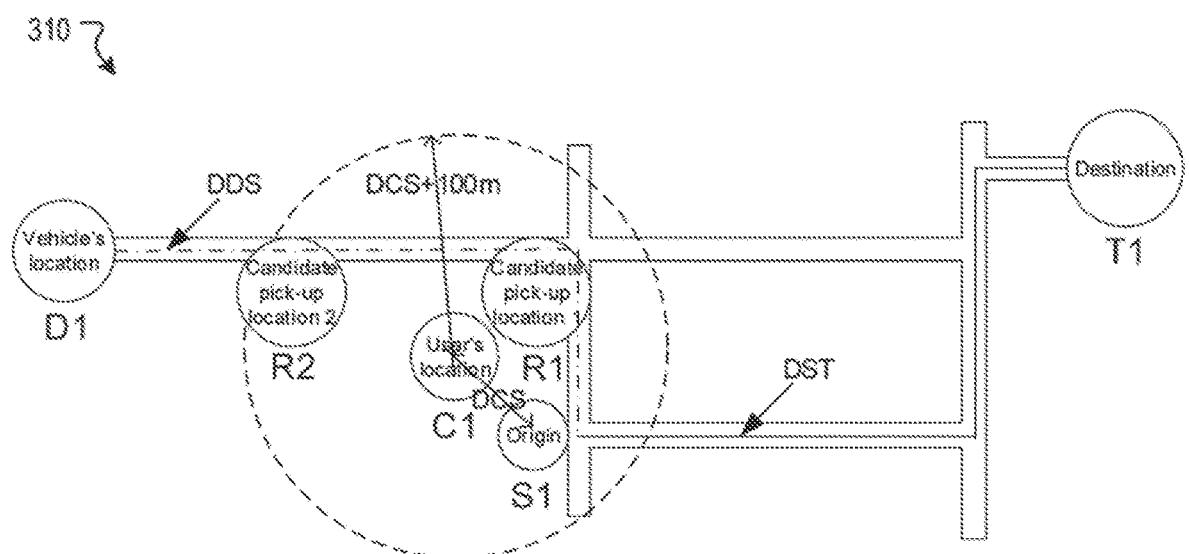
FIGS. 3B-3D are example illustrations of determining and recommending vehicle pick-up locations, in accordance with various embodiments.
Figure 3C:
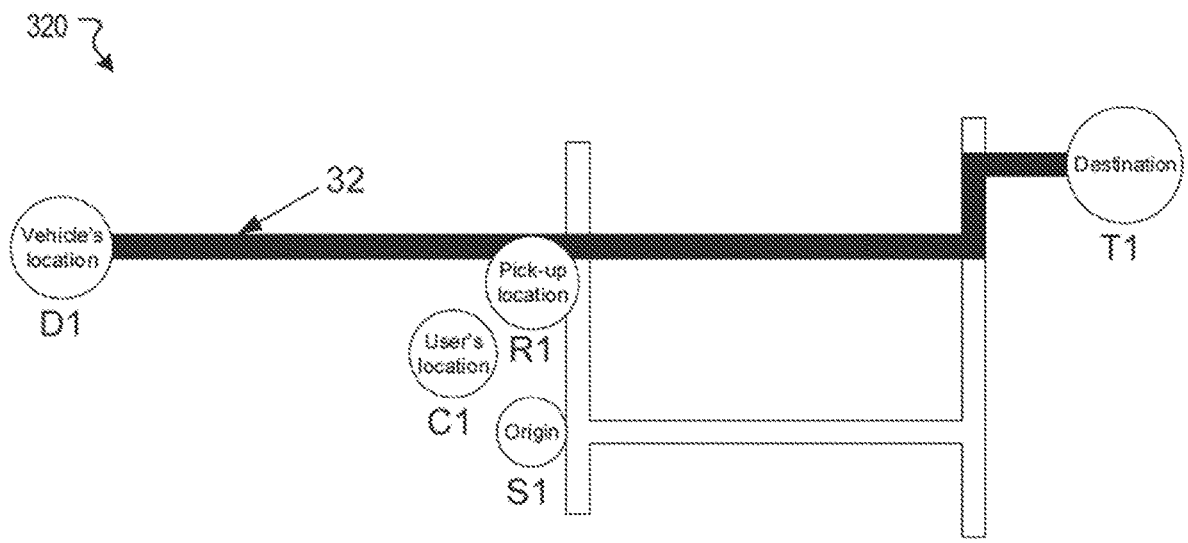
Figure 3D:
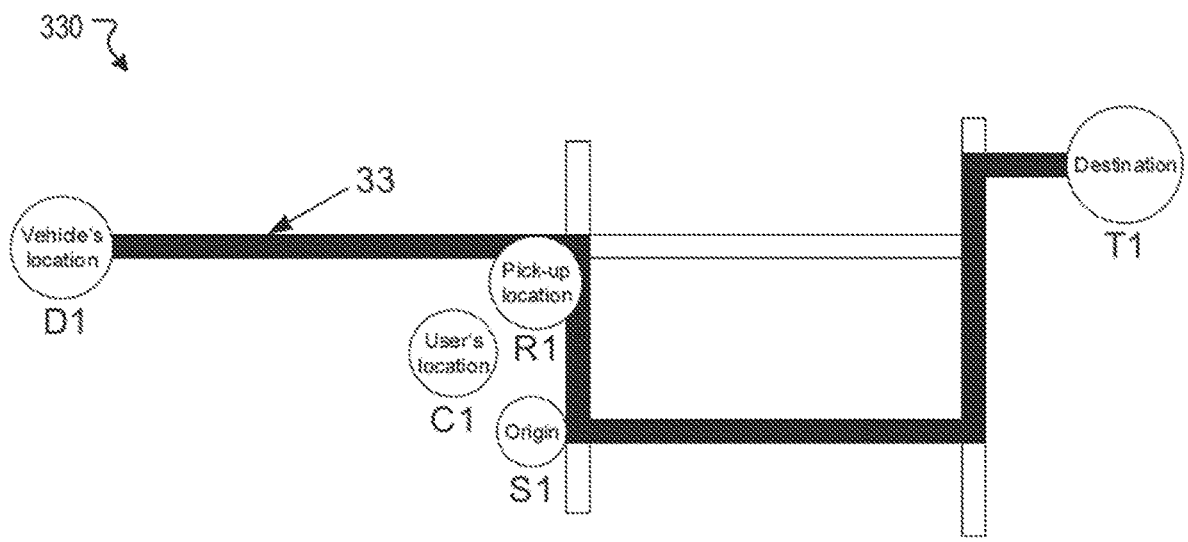

FIG. 2B can be better illustrated with reference to FIGS. 3A-3D each showing a map view of navigation among various routes. FIGS. 3A-3D illustrate routes based on a similar map, and can be similarly applied to various other geographic environments. FIG. 3A is an example illustration of vehicle pick-up in prior art. FIGS. 3B-3D are example illustrations of determining and recommending vehicle pick-up locations, in accordance with various embodiments. The descriptions of FIGS. 3B-3D are intended to be illustrative and may be modified in various ways according to the implementation. As shown in FIG. 3A, in prior art, a user at location C0 may request for a vehicle service to transport the user from origin S0 to destination T0. A vehicle at location D0 may receive the request and proceed to location S0 to pick up the user and fulfill the request. The overall travel distance for the vehicle is route 30 is indicated as a blackened route.

The disclosed systems and methods can determine and recommend routes for the vehicle driver and/or the user to travel more efficiently. Referring back to FIG. 2B and FIGS. 3B-3D (blocks 251-257 of FIG. 2B are illustrated in FIG. 3B, block 258 of FIG. 2B is illustrated in FIG. 3C, and block 258 of FIG. 2B is illustrated in FIG. 3D), at block 251, vehicle's or vehicle driver's location (D1) and a request, including a user or customer's location (C1), origin (S1), and destination (T1) may be received. S1 may be assumed as the origin, a default pick-up location. At block 252, a distance DCS between C1 and S1 (e.g., a walking distance for the user from C1 to S1) may be obtained. At block 253, one or more candidate pick-up locations (e.g., locations within (DCS+100 m) from C1) may be obtained as Ri=[R1, R2 . . . Rn]. The candidate pick-up locations may be obtained from the database of locations described above, or any other suitable source. Here, (DCS+100 m) can be an example of the preset range from the user's location described above. The "100 m" can be dynamically adjusted as described above similar to the weights. If the origin is not provided, the preset range from the user's location can be a dynamically adjustable distance from the user's location. If Ri is empty, the method 250 may proceed to block 259 as described below. If Ri is not empty, the method 250 may proceed to block 254. At block 254, for the vehicle, a travel distance from D1 to S1 may be obtained as DDS (shown as dash-dot lines in FIG. 3B), a travel time from D1 to S1 may be obtained as TDS, a travel distance from S1 to T1 may be obtained as DST (shown as straight lines in FIG. 3B), and a travel time from S1 to T1 may be obtained as TST. At block 255, for the vehicle and for all candidates in Ri, a travel distance from D to Ri may be obtained as DDRi, a travel time from D to Ri may be obtained as TDRi, a travel distance from Ri to T may be obtained as DRiT, a travel time from Ri to T may be obtained as TRiT, and a travel distance from C to Ri may be obtained as DCRi. At block 256, for each Ri, a score GRi=W1(DDS−DDRi)+W2(DST−DRiT)+W3(TDS−TDRi)+W4 (TST−TRiT) may be obtained. W1-W4 may be various weights, for example, W1=W2=0.01, W3=W4=0.1. DDS, DDRi, and/or (DDS-DDRi) may be referred to as the first travel distance from the vehicle's location to the pick-up location. DST, DRiT, and/or (DST-DRiT) may be referred to as the second travel distance from the pick-up location to the destination. TDS, TDRi, and/or (TDS-TDRi) may be referred to as the first travel time from the vehicle's location to the pick-up location. TST, TRiT, and/or (TST-TRiT) may be referred to as the second travel time from the pick-up location to the destination. The score can determine the driver' utility, e.g., the driver's utility of travel from accepting the user's request to reaching the destination and fulfilling the request. As described above, all of the weights may be dynamically adjustable (e.g., based on time, season, region, location, weather, weekday, weekend, holiday, etc.). The dynamic adjustment may reflect the changing factor weights in determining the driver's utility. Further, machine learning methods can also be applied to train the algorithm and/or weights based on prior data. At block 257, for all Ri, GRi may be ranked to obtain the largest GRi as GRmax. Assuming R1 and R2 as examples shown in FIG. 3B, R1 may be determined as the pick-up location, that is, GRmax=GR1.

In some embodiments, if GRmax is larger than 0, and DCRi is smaller than 100 m, the method 250 may proceed to block 258. If GRmax is no larger than 0 or DCRi is no smaller than 100 m, the method 250 may proceed to block 259. At block 258, the candidate pick-up location corresponding to GRmax may be obtained as the new pick-up location (e.g., the recommended pick-up location 204 described above). The new pick-up location may be recommended to the user, and the user can accept or reject the new pick-up location. As shown in FIG. 3C, based on the new pick-up location, the vehicle would travel via route 32 to pick up the user at location R1. Route 33 is shorter than route 30 describe above, providing significant travel benefits. For example, the driver travels less distance overall between accepting the request and having transported the user to the destination. Moreover, the user saves overall travel time and reaches the destination faster and pays less fee for the shorter vehicle service. At block 259, no new pick-up location may be recommended, and the origin may be kept as the pick-up location. As shown in FIG. 3D, the vehicle would travel via route 33 to pick up the user at origin S1. Alternatively, the method may proceed back to block 257, use the second largest GRi as GRmax, and run the remaining steps. The method may run by every GRi according to their ranking until finding a GRi that meets the condition to block 258 in FIG. 2B.

In some embodiments, the condition of comparing the GRmax with 0 can reflect the driver's utility. GRmax>0 indicates that the driver can save at least some time and/or distance by picking up at the pick-up location. GRmax<=0 indicates that the driver will not save time and distance overall by picking up at the pick-up location, and the origin should be used.

In some embodiments, the condition of comparing DCRi with 100 m (or another threshold) may embody the utility of the user. As discussed above, this threshold can also be dynamically adjustable similarly as the weights. The threshold may reflect the willingness of the user to walk to the pick-up location. In some embodiments, this condition of DCRi comparison may be incorporated in the score determination described above to combine the utility determination for the driver and the utility determination for the user. In that case, DCRi can also be assigned a significant weight to prioritize the user's utility.

There can also be many other ways to express, modify, or combine the above conditions. As described, the score determination and the thresholding can factor in the utilities of the driver and the user in a balanced determination. Various weights and thresholds can be dynamically adjusted to reflect the current preferences of the driver and the user. Thus, the overall travel efficiency for the driver and the user can be enhanced and optimized.

Figure 4:
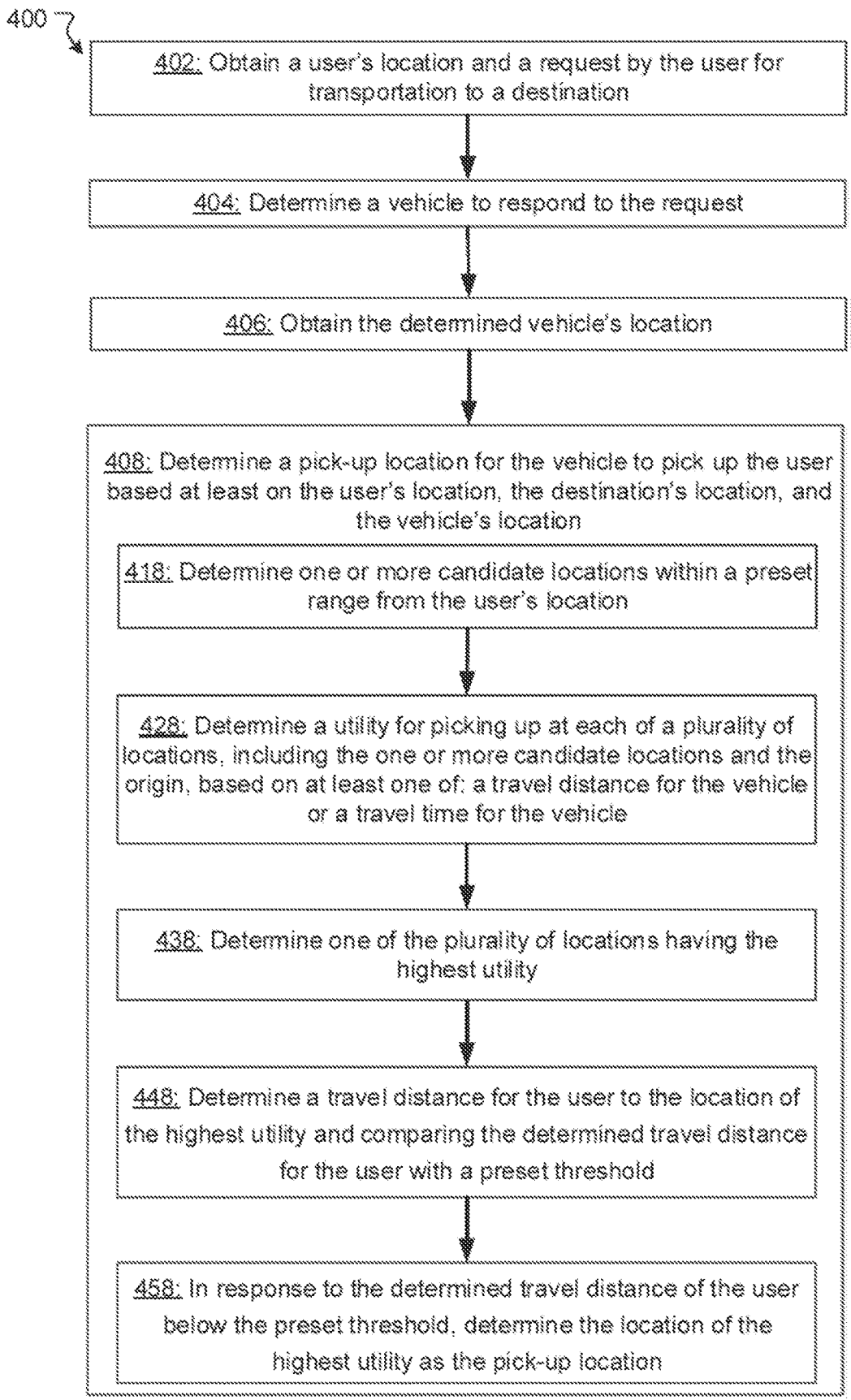
FIG. 4 illustrates a flowchart of an example method for determining and recommending vehicle pick-up locations, in accordance with various embodiments.

FIG. 4 illustrates a flowchart of an example method 400, according to various embodiments of the present disclosure. The method 400 may be implemented in various environments including, for example, the environment 100 of FIG. 1. The method 400 may be implemented by one or more component of various system including, for example, the processor 104 and/or the memory 106 of the system 200 of FIG. 2A. The method 400 may be implemented by a server (e.g., the system 102). The operations of method 400 presented below are intended to be illustrative. Depending on the implementation, the example method 400 may include additional, fewer, or alternative steps performed in various orders or in parallel.

At block 402, a user's location and a request by the user for transportation to a destination may be obtained. At block 404, a vehicle to respond to the request may be determined. At block 406, the determined vehicle's location may be obtained. At block 408, a pick-up location for the vehicle to pick up the user may be determined based at least on the user's location, the destination's location, and the vehicle's location. In some embodiments, the request may optionally include an origin, and the pick-up location determination is also based on the origin.

The block 408 may comprise sub-steps 418-438. At block 418, one or more candidate locations within a preset range from the user's location may be determined. At block 428, a utility for picking up at each of a plurality of locations, including the one or more candidate locations and the origin, may be determined based on at least one of: a travel distance for the vehicle or a travel time for the vehicle. The travel distance for the vehicle may comprise a first travel distance from the vehicle's location to the pick-up location and a second travel distance from the pick-up location to the destination. The travel time for the vehicle may comprise a first travel time from the vehicle's location to the pick-up location and a second travel time from the pick-up location to the destination. At block 438, one of the plurality of locations having the highest utility may be determined (e.g., by ranking the utilities). The utility may be inversely proportional to each of the travel distance for the vehicle and the travel time for the vehicle. At block 448, a travel distance for the user to the location of the highest utility may be determined and compared with a preset threshold. At block 458, in response to the determined travel distance of the user below the preset threshold, the location of the highest utility may be determined as the pick-up location.

In some embodiments, though not shown in this figure, the method 400 may further comprise transmitting the pick-up location to a device associated with the user in recommendation of replacing the original with the pick-up location, in response to receiving an acceptance of the pick-up location, transmitting the pick-up location to the vehicle or a device associated with a driver of the vehicle, and in response to receiving a rejection of the pick-up location, transmitting the origin to the vehicle or the device associated with the driver of the vehicle.

The techniques described herein can be implemented by one or more special-purpose computing devices. The special-purpose computing devices may include one or more hardware processors programmed to perform the techniques pursuant to program instructions in firmware, memory, other storage, or a combination. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
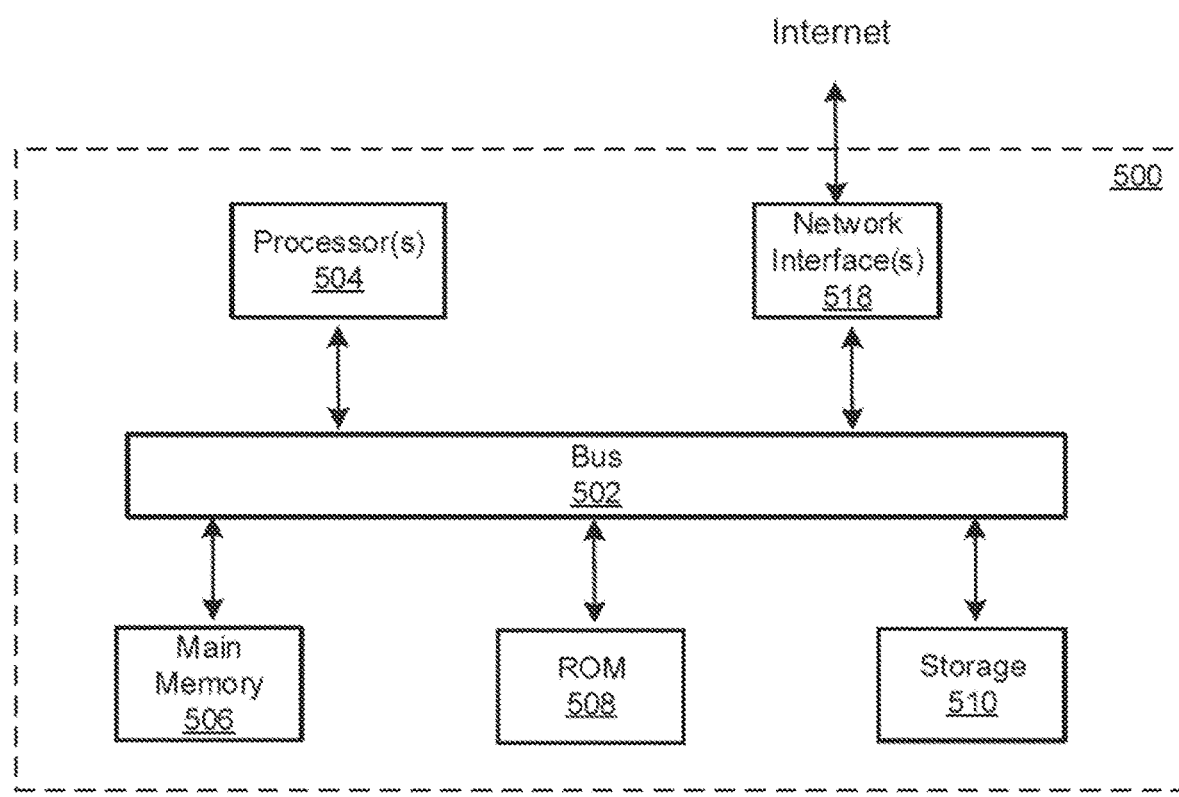
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims.

The specification and drawings are, accordingly, to be regarded in an illustrative rather than a restrictive sense. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for determining vehicle pick-up location, comprising:
    obtaining a user's location and a request by the user for transportation to a destination based at least in part on global position system (GPS) data from a user GPS installed on a device associated with the user;
    determining a vehicle to respond to the request;
    obtaining the determined vehicle's location based at least in part on the vehicle's GPS data from a vehicle GPS associated with the vehicle or a GPS installed on a device associated with a driver of the vehicle;
    determining a pick-up location for the vehicle to pick up the user based at least on the user's location, the destination's location, and the vehicle's location, wherein the determining of the pick-up location comprises:
        determining one or more candidate locations within a preset range from the user's location;
        determining a utility for picking up at each of a plurality of locations, including the one or more candidate locations, based on a travel distance for the vehicle;
        determining one of the plurality of locations having the highest utility;
        determining a travel distance for the user to the location of the highest utility and comparing the determined travel distance for the user with a preset threshold; and
        in response to the determined travel distance of the user below the preset threshold, determining the location of the highest utility as the pick-up location, wherein:
            the travel distance for the vehicle comprises a first travel distance from the vehicle's location to the pick-up location and a second travel distance from the pick-up location to the destination; and
            the utility is inversely proportional to the travel distance for the vehicle; and
    directing the device associated with the user to display the pick-up location as a pop-up on an interface of the device associated with the user prompting the user to accept or decline.

2. The method of claim 1, wherein:
    the request comprises transporting at least one of the user, a person associated with the user, or an item associated with the user from an origin to the destination; and
    the origin is a default pick-up location.

3. The method of claim 2, wherein the determining of the utility for picking up at each of the plurality of locations comprises:

determining the utility for picking up at each of the plurality of locations, including the one or more candidate locations and the origin, further based on a travel time for the vehicle; and wherein: the travel time for the vehicle comprises a first travel time from the vehicle's location to the pick-up location and a second travel time from the pick-up location to the destination.

4. The method of claim 3, wherein
each of the first and second travel distances for the vehicle and the first and second travel time for the vehicle has a corresponding weight in determining the utility; and
the first and second travel distances for the vehicle have weights larger than the first and second travel time for the vehicle.

5. The method of claim 2, further comprising:
transmitting the pick-up location to the device associated with the user in recommendation of replacing the origin with the pick-up location;
in response to receiving an acceptance of the pick-up location, transmitting the pick-up location to the vehicle or the device associated with the driver of the vehicle; and
in response to receiving a rejection of the pick-up location, transmitting the origin to the vehicle or the device associated with the driver of the vehicle.

6. The method of claim 1, wherein:
determining the vehicle to respond to the request comprises:
determining one or more candidate vehicles within a preset range from the user's location,
transmitting the request to the one or more candidate vehicles, and
determining at least one of the candidate vehicles accepting the request as the vehicle to respond to the request.

7. A system for determining vehicle pick-up location, comprising:
a server configured to:
obtain a user's location and a request by the user for transportation to a destination based at least in part on global position system (GPS) data from a user GPS installed on a device associated with the user;
determine a vehicle to respond to the request;
obtain the determined vehicle's location based at least in part on the vehicle's GPS data from a vehicle GPS associated with the vehicle or a GPS installed on a device associated with a driver of the vehicle;
determine a pick-up location for the vehicle to pick up the user based at least on the user's location, the destination's location, and the vehicle's location, wherein the determining of the pick-up location comprises:
determine one or more candidate locations within a preset range from the user's location;
determine a utility for picking up at each of a plurality of locations, including the one or more candidate locations, based on a travel time for the vehicle;
determine one of the plurality of locations having the highest utility;
determine a travel distance for the user to the location of the highest utility and compare the determined travel distance for the user with a preset threshold; and
in response to the determined travel distance of the user below the preset threshold, determine the location of the highest utility as the pick-up location, wherein:
the travel time for the vehicle comprises a first travel time from the vehicle's location to the pick-up location and a second travel time from the pick-up location to the destination; and
the utility is inversely proportional to the travel time for the vehicle; and
directing the device associated with the user to display the pick-up location as a pop-up on an interface of the device associated with the user prompting the user to accept or decline.

8. The system of claim 7, wherein:
the request comprises transporting at least one of the user, a person associated with the user, or an item associated with the user from an origin to the destination; and
the origin is a default pick-up location.

9. The system of claim 8, wherein: to determine the utility for picking up at each of the plurality of locations, the server is configured to:
determine the utility for picking up at each of the plurality of locations, including the one or more candidate locations and the origin, further based on a travel distance for the vehicle; and
wherein:
the travel distance for the vehicle comprises a first travel distance from the vehicle's location to the pick-up location and a second travel distance from the pick-up location to the destination.

10. The system of claim 9, wherein:
each of the first and second travel distances for the vehicle and the first and second travel time for the vehicle has a corresponding weight in determining the utility; and
the first and second travel distances for the vehicle have weights larger than the first and second travel time for the vehicle.

11. The system of claim 8, wherein the server is further configured to:
transmit the pick-up location to the device associated with the user in recommendation of replacing the origin with the pick-up location;
in response to receiving an acceptance of the pick-up location, transmit the pick-up location to the vehicle or the device associated with the driver of the vehicle; and
in response to receiving a rejection of the pick-up location, transmit the origin to the vehicle or the device associated with the driver of the vehicle.

12. The system of claim 7, wherein
to determine the vehicle to respond to the request, the server is configured to:
determine one or more candidate vehicles within a preset range from the user's location,
transmit the request to the one or more candidate vehicles, and
determine at least one of the candidate vehicles accepting the request as the vehicle to respond to the request.

13. A non-transitory computer-readable storage medium storing instructions that, when executed by a processor, cause the processor to perform a method for determining vehicle pick-up location, the method comprising:
obtaining a user's location and a request by the user for transportation to a destination based at least in part on global position system (GPS) data from a user GPS installed on a device associated with the user;
determining a vehicle to respond to the request;
obtaining the determined vehicle's location based at least in part on the vehicle's GPS data from a vehicle GPS associated with the vehicle or a GPS installed on a device associated with a driver of the vehicle;

determining a pick-up location for the vehicle to pick up the user based at least on the user's location, the destination's location, and the vehicle's location, wherein the determining of the pick-up location comprises:

determining one or more candidate locations within a preset range from the user's location;

determining a utility for picking up at each of a plurality of locations, including the one or more candidate locations, based on a travel distance for the vehicle;

determining one of the plurality of locations having the highest utility;

determining a travel distance for the user to the location of the highest utility and comparing the determined travel distance for the user with a preset threshold; and in response to the determined travel distance of the user below the preset threshold, determining the location of the highest utility as the pick-up location, wherein:

the travel distance for the vehicle comprises a first travel distance from the vehicle's location to the pick-up location and a second travel distance from the pick-up location to the destination; and the utility is inversely proportional to the travel distance for the vehicle; and directing the device associated with the user to display the pick-up location as a pop-up on an interface of the device associated with the user prompting the user to accept or decline.

14. The non-transitory computer-readable storage medium of claim 13, wherein:

the request comprises transporting at least one of the user, a person associated with the user, or an item associated with the user from an origin to the destination; and the origin is a default pick-up location.

15. The non-transitory computer-readable storage medium of claim 14, wherein the determining of the utility for picking up at each of the plurality of locations comprises determining the utility for picking up at each of the plurality of locations, including the one or more candidate locations and the origin, further based on a travel time for the vehicle; and wherein:

the travel time for the vehicle comprises a first travel time from the vehicle's location to the pick-up location and a second travel time from the pick-up location to the destination.

16. The non-transitory computer-readable storage medium of claim 14, wherein the method further comprises:

transmitting the pick-up location to the device associated with the user in recommendation of replacing the origin with the pick-up location;

in response to receiving an acceptance of the pick-up location, transmitting the pick-up location to the vehicle or the device associated with the driver of the vehicle; and in response to receiving a rejection of the pick-up location, transmitting the origin to the vehicle or the device associated with the driver of the vehicle.

17. The non-transitory computer-readable storage medium of claim 13, wherein:

determining the vehicle to respond to the request comprises:

determining one or more candidate vehicles within a preset range from the user's location, transmitting the request to the one or more candidate vehicles, and determining at least one of the candidate vehicles accepting the request as the vehicle to respond to the request.

* * * * *